Figure 1:
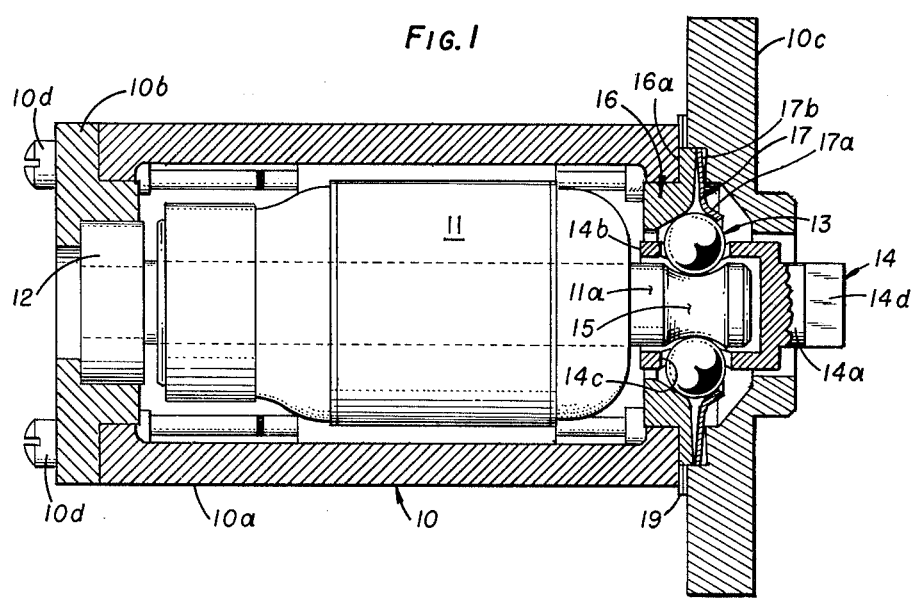

Nov. 9, 1965    J. W. RICHARDS    3,217,196

MOTOR AND SPEED-REDUCING DRIVE ASSEMBLY

Filed Dec. 13, 1962

United States Patent Office 3,217,196
Patented Nov. 9, 1965

3,217,196
MOTOR AND SPEED-REDUCING DRIVE
ASSEMBLY
James W. Richards, Canoga Park, Calif., assignor to The Bendix Corporation, North Hollywood, Calif., a corporation of Delaware
Filed Dec. 13, 1962, Ser. No. 244,391
4 Claims. (Cl. 310—83)

This invention relates to power actuators and is particularly useful in small electrical rotary motors for actuating switches, valves and other controlled elements at a distance.

It is desirable in small electrical actuators of this type to employ high-speed motors (in conjunction with speed-reducing, torque-multiplying transmissions) to reduce the size and cost of the motors for a given power output. It is also often desirable to employ a slip clutch in the drive to prevent excess stresses, should the motor continue to rotate after the controlled element has reached an end position. The two functions of speed reduction and slip clutch action have sometimes been accomplished with planetary ball gearing mechanisms in the past.

An object of the present invention is to provide a motor with a planetary ball gearing mechanism in which a single set of balls performs the dual function of:

(1) An anti-friction bearing supporting one end of the motor shaft; and
(2) Effecting speed reduction and torque limitation between the motor shaft and an output shaft.

Another object is to provide such a mechanism in which the output shaft has some radial free movement with respect to the motor shaft, to eliminate need of exact alignment between the motor and the device driven thereby.

Another object is to provide a simple and effective structure whereby the tightness of the balls in the races may be adjusted.

Figure 2:
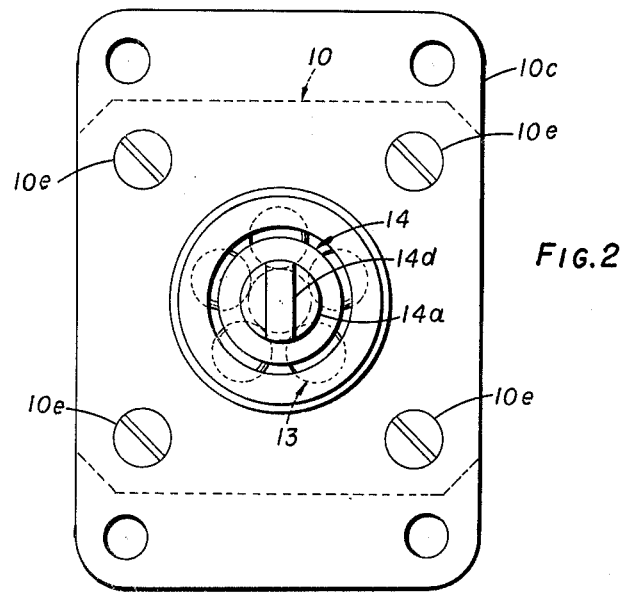

Other more specific objects and features of the invention will appear from the following detailed description with reference to the drawing in which:

FIG. 1 is a longitudinal sectional view through a motor and speed-reducing drive assembly in accordance with the invention; and FIG. 2 is an end view looking at the right end of FIG. 1.

FIG. 1 discloses a motor having a stator 10 and a rotor 11. The stator 10, as shown, comprises a tubular casing 10a having end caps 10b and 10c secured thereto by screws 10d and 10e, respectively. Insofar as the present invention is concerned the only portion of the rotor 11 that is of interest is the shaft 11a which is supported at its left end by a conventional ball bearing 12 and at its right end by bearing balls 13 which are engaged between an inner race 15 formed in the shaft 11a and an outer race consisting of two annular elements 16 and 17 affixed to the stator 10.

The race element 16 is of rigid construction having a cylindrical outer surface fitting in the outer end of the tubular casing 10a and having a flange 16a overlying the end face of the casing 10a. The race element 17 is of resilient sheet metal construction having a frusto-conical portion 17a engaging the balls 13 and a flange portion 17b extending outwardly from the frusto-conical portion 17a and overlying the flange 16a. When unstressed, the flanged portion 17b is not flat but has a very slight frusto-conical shape from which it is deflected toward planar shape when compressed. The flanges 17b and 16a are compressed between the end face of the tubular casing 10a and the end cap 10c to a variable extent determined by the thickness of a stack of shims 19 interposed between juxtaposed portions of the end face of the tubular casing member 10a and the end cap 10c which are radially exterior of the flanges 16a and 17. The bearing pressure, which determines the frictional resistance to sliding movement between the balls 13 and the inner and outer races, may be varied by varying the total thickness of the shims 19.

The output shaft 14 comprises a stub shaft 14a having a cylindrical integral skirt 14b extending between the inner and the outer races and having apertures 14c through which the bearing balls 13 extend. The skirt 14b constitutes a cage for separating the balls 13 from each other and forcing the output shaft 14 to rotate in response to the revolution of the balls about the motor axis.

It will be apparent that, so long as the load on the output shaft is insufficient to prevent rolling of the balls 13 with respect to the races, the balls will revolve about the axis of the shaft, and the output shaft 14 will rotate at a lesser rate than the shaft 11a. If the load on the output shaft becomes excessive, the balls 13 will slip with respect to one or both of the races and permit the shaft 14 to stop.

In addition to reducing the speed of and increasing the torque applied to the output shaft 14, the balls 13 perform the function of radially supporting the right end of the motor shaft 11a thereby providing a simpler, cheaper and more compact structure.

As shown in FIG. 2, the output shaft 14a may have a diametral tongue 14d for engaging a diametral slot in a shaft on the controlled element (not shown) to be driven. The shaft of the controlled element may also have a collar on it which engages the outer surface of the stub shaft 14a to maintain the two shafts in substantial alignment. However these shafts need not necessarily be in perfect alignment, because the radial dimensions of the skirt portion 14b of the output shaft are such as to permit relative radial movement between the output shaft 14 and the rotor shaft 11a.

Although for the purpose of explaining the invention a particular embodiment thereof has been shown and described, obvious modifications will occur to a person skilled in the art, and I do not desire to be limited to the exact details shown and described.

I claim:
1. A motor including a speed-reducing mechanism comprising:
  a motor stator and a motor rotor within the stator;
  first bearing means at one end of said stator for rotatably radially supporting one end of said rotor;
  second bearing means at the other end of said stator for rotatably supporting the other end of said rotor with respect to said stator and comprising radially supporting inner race means fixed with respect to said rotor, radially supporting outer race means fixed with respect to said stator, and rolling elements tightly engaged between said inner and outer race means for rolling motion with respect to said outer race means in response to rotation of said rotor, said rolling elements being spaced circumferentially from each other;
  a rotary output element at least approximately coaxial with said rotor at said other end thereof and having portions at one end projecting parallel to the axis of rotation into said spaces between said rolling elements whereby said rolling motion of the rolling elements rotates said output element.
2. Apparatus according to claim 1 in which said output element has substantial radial lost motion relative to said stator and rotor whereby it can be secured to a rotary-driven member having an axis non-coaxial with respect to said rotor axis.

3. Apparatus according to claim 1 in which said rolling elements are balls and said outer race means comprises two annular race members engaging said balls on opposite sides of the common center plane of the balls, one of said members being rigid and the other being of resilient sheet material having a first frusto-conical portion bearing against said balls and a second flange portion extending outwardly from the outer edge of said first portion, and means axially supporting said second portion to stress said first portion against said balls.

4. A ball bearing comprising an inner race and an outer race and an annular row of balls contained between said races, in which said outer race comprises two annular race members engaging said balls on opposite sides of the common center plane of the balls, one of said members being rigid and the other being of resilient sheet material having a first frusto-conical portion bearing against said balls and a second flange portion extending outwardly from the outer edge of said first portion, and means axially supporting said second portion to stress said first portion against said balls.

References Cited by the Examiner
UNITED STATES PATENTS

| | | | |
|---|---|---|---|
| 2,334,002 | 11/43 | Heintz | 308—174 |
| 2,454,268 | 11/48 | Brackett | 308—174 |
| 2,467,870 | 4/49 | Stephenson | 310—83 |
| 2,885,579 | 5/59 | Lemp | 310—90 |
| 3,008,061 | 11/61 | Mims et al. | 310—83 |

MILTON O. HIRSHFIELD, *Primary Examiner.*